US008833988B2

(12) United States Patent
Larsson

(10) Patent No.: US 8,833,988 B2
(45) Date of Patent: Sep. 16, 2014

(54) STORAGE COMPARTMENT AND WARNING LIGHTING FOR A VEHICLE

(75) Inventor: Annika Larsson, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 252 days.

(21) Appl. No.: 13/438,380

(22) Filed: Apr. 3, 2012

(65) Prior Publication Data
US 2012/0262933 A1 Oct. 18, 2012

(30) Foreign Application Priority Data

Apr. 13, 2011 (EP) .................................... 11162244

(51) Int. Cl.
B60Q 1/00 (2006.01)
B60Q 1/30 (2006.01)
B60Q 7/00 (2006.01)
B60Q 3/06 (2006.01)

(52) U.S. Cl.
CPC ........ B60Q 3/065 (2013.01); B60Q 1/30 (2013.01); B60Q 7/00 (2013.01)
USPC ............ 362/496; 362/497; 362/514; 362/543

(58) Field of Classification Search
CPC ............ B60Q 1/30; B60Q 3/065; B60Q 7/00; B60Q 3/023
USPC .................. 362/496, 497, 514, 543
See application file for complete search history.

(56) References Cited

U.S. PATENT DOCUMENTS

| 2,128,679 | A | * | 8/1938 | Kielian | .......................... 362/497 |
| 4,875,028 | A | * | 10/1989 | Chou | ............................ 340/473 |
| 5,580,153 | A | | 12/1996 | Motz | |
| 2005/0073852 | A1 | | 4/2005 | Ward | |
| 2009/0026959 | A1 | | 1/2009 | Lin et al. | |

FOREIGN PATENT DOCUMENTS

| DE | 29510280 U1 | 8/1995 |
| DE | 102006012606 A1 | 11/2007 |
| FR | 2728210 A1 | 6/1996 |
| FR | 2889132 A1 | 2/2007 |
| GB | 2215450 A | 9/1989 |

OTHER PUBLICATIONS

European Patent Office, Extended European Search Report for corresponding EP Patent Application No. EP 11 16 2244 mailed Jul. 6, 2011.

* cited by examiner

Primary Examiner — Vip Patel
(74) Attorney, Agent, or Firm — Brooks Kushman P.C.

(57) ABSTRACT

A convenience light for the rear storage area of a motor vehicle also serves as a breakdown warning light. A light source on an underside of the storage compartment lid is a warning light visible from behind the when the compartment lid is open. A reflective panel is disposed on a lid-receiving portion of the vehicle body to reflect light from the light source toward the lid when the lid is open, so that the light and reflective panel combine to serve as a convenience light for the storage area. The light is detachably attached to the compartment lid and has a battery to power the light when detached from the compartment lid. The light source has three lighted segments foldable relative to one another when detached from the compartment lid to form a triangle. The light is thus usable as a warning triangle for a disable vehicle.

20 Claims, 2 Drawing Sheets

STORAGE COMPARTMENT AND WARNING LIGHTING FOR A VEHICLE

CROSS-REFERENCE TO RELATED APPLICATIONS

This application claims foreign priority benefits under 35 U.S.C. §119(a)-(d) to EP 11162244.5, filed Apr. 13, 2011, the disclosure of which is incorporated in its entirety by reference herein.

TECHNICAL FIELD

The present disclosure relates to an illumination system for a rear storage compartment of a vehicle. The disclosure further relates to a detachable light source that may be separated from the vehicle and set on the ground for use as warning triangle.

BACKGROUND

In order to be able to locate objects in a rear storage compartment (such as the trunk of a sedan or coupe, and the enclosed rear area of a van, station wagon, hatch-back, or similar vehicle) in conditions of darkness, rear storage compartments are commonly provided with a light source. The light source may be arranged in the trunk lid as disclosed by the document U.S. Pat. No. 5,580,153. According to this document one light source may be used both as a brake light, when emitting light rearwards through a red lens, and as a trunk illumination, when emitting light downwards through a clear or neutral lens. Additionally the license plate lamps may be used to illuminate the trunk when the trunk lid is open. U.S. Pat. No. 5,580,153 also teaches that the generated light only has one color, which is then modified by one of the lenses and may only be changed by replacing the lens.

In case of an accident or a disabled vehicle, a warning triangle is commonly placed on the ground in the vicinity of the vehicle in order to warn other road users. Preferably, it should be easy and quick to locate the warning triangle, such that no unnecessary time is lost before it is set up.

SUMMARY

In a disclosed embodiment, an illumination system is provided for a motor vehicle having a body defining a rear storage compartment and a storage compartment lid movable relative to the body between an open and a closed position. The illumination system comprises a light source located on an underside of the compartment lid, and a reflective panel disposed on a lid-receiving portion of the body inside of the compartment in a position such that light emitted by the light source when the lid is in the open position is reflected toward the lid. The light source thus provides a warning light visible to motorists approaching the vehicle from behind when the compartment lid is open, as well as providing a convenience light to illuminate the interior of the storage compartment.

In another embodiment, the light source is detachably attached to the compartment lid and comprises an energy source powering the light source when detached from the compartment lid. When detached from the lid, the light may be positioned a desired distance from a disabled vehicle to serve as a warning light.

In another embodiment, the light source comprises three lighted segments foldable relative to one another when detached from the compartment lid to form a triangle. The light is thus usable as a warning triangle for a disable vehicle, as is required by law in many countries.

In another disclosed embodiment, apparatus comprises a warning light having three lighted segments foldably interconnected with one another to permit movement of the segments between a triangular condition and an unfolded condition wherein the segments are generally linear in configuration, and a lid for covering a rear storage compartment of a motor vehicle. The lid has a receptacle located on an underside and adjacent to a rear edge thereof, the receptacle adapted to detachably receive the warning light when in the unfolded condition.

In another disclosed embodiment, a motor vehicle comprises a rear body defining a compartment, a compartment lid movable relative to the rear body between an open and a closed position, a light source located on an underside of the compartment lid, and a reflective panel disposed on a lid-receiving portion of the body inside of the compartment. The reflective panel is positioned such that light emitted by the light source when the lid is in the open position is reflected toward the lid to provide convenience lighting inside of the compartment.

BRIEF DESCRIPTION OF THE DRAWINGS

The present invention will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1:
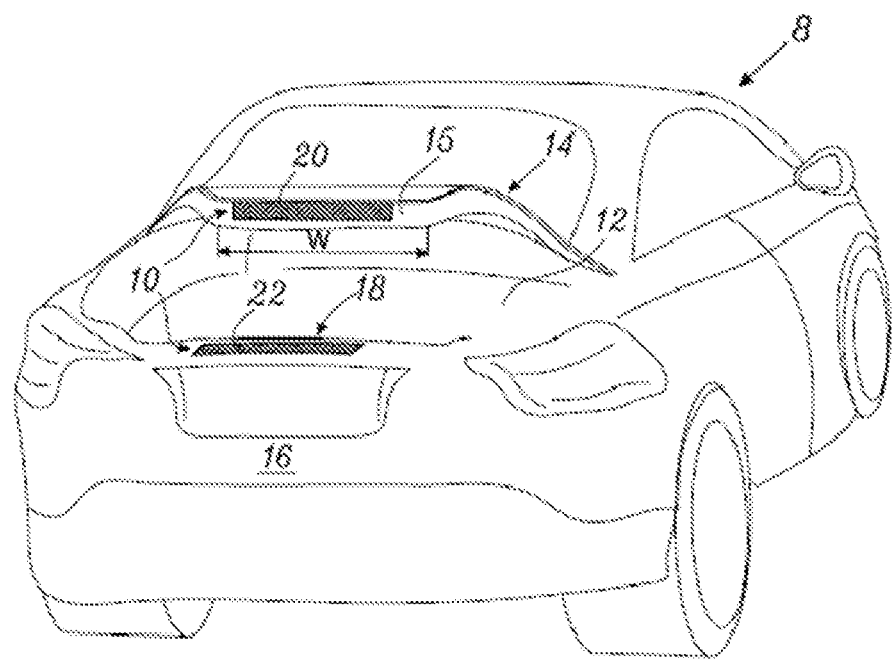
FIG. 1 is a schematic drawing of an illumination system for a trunk of a vehicle according to the invention.

FIG. 1 schematically illustrates an illumination system 10 for a trunk 12 of a vehicle 8. The trunk 12 is delimited by a trunk lid 14 and a vehicle body portion 16. The trunk lid 14 has a front end hingedly connected (not illustrated) to the vehicle body portion 16. The trunk lid 14 further has an open and a closed position and is movable therebetween. The trunk lid 14 has a width w in the transverse direction of the vehicle at a rear end 15 of the trunk lid 14. The vehicle body portion 16 comprises a trunk lid-receiving portion 18 formed to receive the rear end 15 of the trunk lid 14 when in the closed position.

Any references to a trunk in relation to the embodiments of the invention depicted in the Figures are also meant to apply to any rear storage compartment of a vehicle having a lid or hatch movable between an open and a closed condition.

The illumination system 10 comprises a light source 20 located at or on the underside of the trunk lid 14 adjacent to its rear end 15. The light source 20 is positioned so as to be visible to a motorist or other viewer located to the rear of the vehicle 8 when the compartment lid is in the open position.

The illumination system 10 further comprises a reflective panel 22 disposed on the trunk lid-receiving portion 18 adjacent to the light source 20 (inside of the trunk 12) when the trunk lid 14 is in its closed position. Reflective panel 22 may, for example, comprise a strip of metal, such as aluminum, or chromated metal or chromated plastic.

The illumination system 10 is arranged such that when the compartment lid 14 is open, light emitted by the light source 20 illuminates the reflective panel 22 and is at least partly reflected toward the interior of the trunk. The reflective panel 22 is adapted to reflect the light emitted by the light source 20. The light may be essentially specularly reflected, i.e. the angle of incidence and the angle of reflection are essentially the same.

The reflective panel reflects the light back upwards towards trunk lid again. The combination of the light source and the opposing reflective panel makes use of the emitted light in an efficient way.

Figure 2:
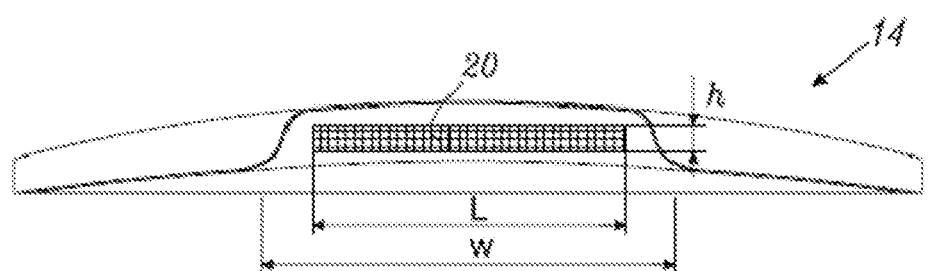
FIG. 2 is a schematic drawing of the rear end of the trunk lid seen in FIG. 1 seen from below.

FIG. 2 illustrates the light source 20 in more detail as viewed from the underside of the trunk lid 14. The light source 20 extends in the transverse direction of the vehicle, such that its length L is greater than its height h. Further, the length L of the light source 20 may be less than or equal to the width w of the trunk lid at its rear end. The length L of the light source 20 may be for example at least 50%, preferably at least 70% and most preferably at least 90% of the width w of the trunk lid 14 at its rear end. Alternatively, not illustrated, the light source may also at least partly cover the sides of the trunk lid.

Thereby the light source is also able to illuminate the rear corners of the trunk. The light source may be adapted to substantially extend all the way between the rear lights of the vehicle.

The light source 20 may comprise means for generating a plurality of colors and as well as means for selecting one of the colors. The plurality of colors may be provided by using green, red and blue light emitting diodes (LEDs) and combining the light from these at various selectable intensity levels. By combining light from the LEDs of at least two different colors at independently selectable levels for each of them, the plurality of different colors is provided. As an example: if the first color may be chosen in n different intensity levels and the second in m different levels, n times m different combinations are selectable.

As an alternative, it may be possible to use only one kind of light source, for which it is possible to set a preferred frequency of the emitted light, i.e. to select a color, for example a tunable light source.

The illumination system may be operable to generate light in a plurality of colors and allow selection of one or more of the plurality of colors to be displayed. The selection of colors may be made by a driver or other occupant of the vehicle. When the purpose is to illuminate the rear storage compartment, a white light may be suitable in order to locate objects in the rear storage compartment. However, in a state of emergency of the vehicle, a red or orange light may be selected in order to warn other road users.

The illumination sources or the light source 20, e.g. the LEDs, may be controllable on an individual level. Thereby it is possible to illuminate the LEDs in a selected sequence to provide a desired visual effect designed to capture the attention of a viewer. For example, a "moving light" effect may be achieved by sequentially activating a row or string of LEDs in a sequence from a first end of the light source towards a second end of the light source and thereafter sequentially deactivating the active light sources, such that the illumination appears to be moving from the first end towards the second end. The emitted light may also, or in an alternative, be controlled to flash.

Figure 3:
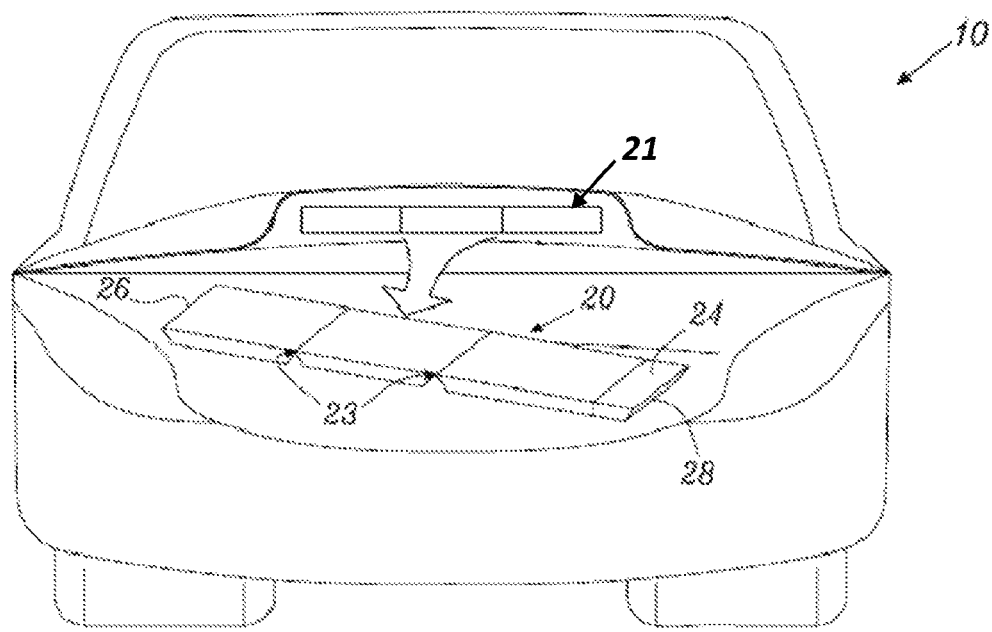
FIG. 3 illustrates an light source according to the invention when being detached from the vehicle.

In the embodiment illustrated in FIG. 3, the light source 20 is detachably secured to a receptacle 21 located at the underside of the trunk lid 14 adjacent to its rear end 15. When the light source 20 is secured to the receptacle 21, the light source is positioned to be visible to a viewer located to the rear of the vehicle 8 (particularly, another motorist approaching from the rear) when the compartment lid is in the open position, as best seen in FIG. 1.

The light source 20 may, for example, be held in connection with the receptacle 21 by magnets, a click-coupling or by easily removable locking elements. This makes it possible to detach the light source from the vehicle and use it as a separate unit.

The receptacle may include an electrical connector that engages a mating connector on the light source 20 when the light source is secured to the receptacle to provide power to the light. When the light source 20 is detachable from the vehicle it becomes usable as a separate unit, and is particularly valuable as a warning light that may be placed on the roadway, shoulder, ground, or other surface an appropriate distance from a disabled vehicle.

The light source 20 may comprise three segments or portions interconnected with one another by two fold lines 23, which may be any type of hinge or flexible joint between adjacent segments. In order to form a triangle, two or three fold lines are appropriate. As an alternative the light source may at least partly be flexible, such that it can be folded at an arbitrary position. When the light source 20 is attached to the vehicle, it is connected to the electrical system of the vehicle to power the LEDs and recharge the battery 24.

The light source 20 may further comprise an energy source such as a rechargeable battery 24 adapted to provide the LEDs with energy when the light source 20 is detached from the vehicle. Thereby a warning triangle formed by the light source will also emit light when it is removed from the vehicle and placed externally of the vehicle, for example a warning triangle being placed a desired/required distance before a vehicle in order to timely warn other road users. The battery 24 may be charged by the vehicle electrical system when the light source is attached to the vehicle.

Figure 4:
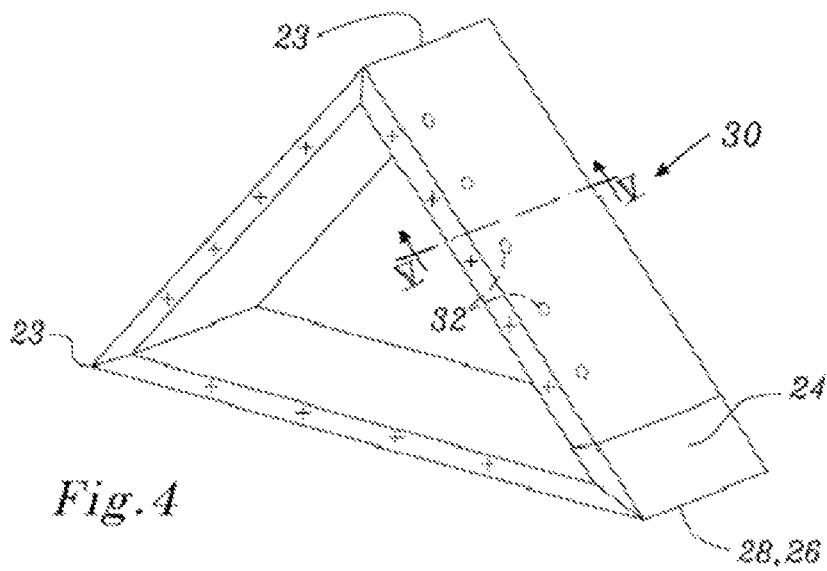
FIG. 4 illustrates the light source of FIG. 3 folded to a warning triangle.
Figure 5:
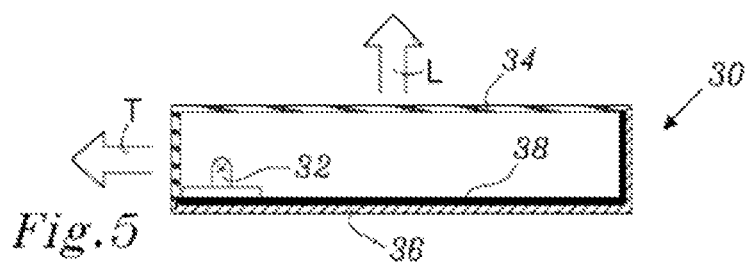
FIG. 5 is a cross-sectional drawing of the light source of FIG. 3.

The light source 20 may comprise one row of LEDs, as shown in FIGS. 3-5, or a plurality of rows. The rows may be essentially parallel to the transverse direction of the vehicle.

The LEDs may be arranged in a hollow body forming the light source at least partly made of a transparent material, for example of acrylic glass.

The fold lines 23 allow the light source 20 to assume a folded condition in which it forms a triangle 30 as illustrated in FIG. 4. A first end 26 and a second end 28 of the light source 20 may be attached to each other, for example by magnets or mating clips at each end. Such magnets or clips may also be used to attach the light source 20 to the receptacle 21. The triangle 30 may be used as a warning light which may be positioned on the roadway, shoulder, ground, or other surface in the vicinity of the stopped vehicle.

When the light source 20 is attached to the trunk lid 14, it is preferably in an unfolded condition wherein the segments are generally linear in configuration, as seen in FIG. 3. The term "generally linear" is intended to include not only the perfectly straight configuration shown in FIG. 3, but any configuration in which the three segments of the light are angled with respect to one another in a range of from approximately 1° to approximately 20°, as may be required to fit the contours of the trunk lid 14 and/or the receptacle 21.

The location of the light source 20 on the underside of the trunk lid 14 makes the warning triangle easy and quick to find when it is needed. Since the light source 20 emits light, the warning triangle is easy to locate in the trunk even in darkness and it is further easy to see for other road users.

At least a part of the surface of the light source 20 may be made of a reflective material to even further increase visibility of the triangle 30. Thereby the warning triangle may be seen in darkness even when the battery 24 has been depleted.

FIG. 5 is a cross-sectional view of the light source 20 of FIG. 3. A LED 32 emits light. When the light source 20 is attached to the trunk lid, the light is mainly emitted in the direction of the arrow L, i.e. downwards towards the reflective region as explained in conjunction with FIG. 1. When the light source 20 is detached and used as a warning triangle, light is also emitted in the direction of the arrow T. The light source 20 comprises a first part 34 which is transparent for the emitted light and a second part 36 which may be opaque. The first part may for example be made of acrylic glass. The inside 38 of the second part 36 may be reflective to improve the light efficiency.

The warning triangle may be partly detachable, such that a part of it, e.g. a tip of the triangle, is still attached to the vehicle whilst the rest of the triangle is detached and hangs down from the trunk lid.

It is to be understood that the expression "trunk lid" is intended to cover not only conventional trunk lids of 3-box design vehicles, but also tailgates of 2-box design vehicles, commonly known as "hatchbacks," "utility vehicles," and "station wagons".

Further modifications of the invention within the scope of the appended claims are feasible. As such, the present invention should not be considered as limited by the embodiments and figures described herein. Rather, the full scope of the invention should be determined by the appended claims, with reference to the description and drawings.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An illumination system for a motor vehicle having a body defining a rear storage compartment and a storage compartment lid movable relative to the body between an open position and a closed position, comprising:
    a light source located on an underside of the compartment lid; and
    an opaque reflective panel disposed on a lid-receiving portion of the body inside of the compartment in an upward-facing position and angled relative to the light source to reflect light emitted by the light source when the lid is in the open position toward the compartment lid.

2. The illumination system according to claim 1 wherein the light source is operable to selectively generate light in of a plurality of colors.

3. The illumination system according to claim 1 wherein the light source comprises a plurality of illumination sources, which are individually controllable.

4. The illumination system according to claim 3, wherein the plurality of illumination sources comprises light emitting diodes of at least two different colors, the light emitting diodes being individually controllable in intensity of light emitted in a manner to produce a selected color.

5. The illumination system according claim 1 wherein the light source is detachably attached to the compartment lid and comprises an energy source powering the light source when detached from the compartment lid.

6. The illumination system according to claim 5, wherein the light source comprises three lighted segments foldable relative to one another when detached from the compartment lid to form a triangle.

7. The illumination system according to claim 6, wherein a first end of the light source is attachable to an opposite second end of the light source to form the triangle.

8. The illumination system according to claim 1 wherein the light source further comprises at least one reflective surface.

9. Apparatus comprising:
    a warning light comprising three lighted segments foldably interconnected with one another to permit movement of the segments between a triangular condition and an unfolded condition wherein the segments are generally linear in configuration; and
    a lid adapted to cover a rear storage compartment of a motor vehicle, the lid having a receptacle located on an underside and adjacent to a rear edge thereof, the receptacle adapted to detachably receive the warning light when in the unfolded condition and in a position wherein the warning light is visible to a viewer located rearward of the vehicle when the lid is in an open position.

10. The apparatus according to claim 9 wherein the lighted segments are operable to selectively generate light in of a plurality of colors.

11. The apparatus according to claim 9 wherein at least one of the lighted segments comprises a plurality of illumination sources, which are individually controllable.

12. The apparatus according to claim 11 wherein the plurality of illumination sources comprises light emitting diodes of at least two different colors, the light emitting diodes being individually controllable in intensity of light emitted in a manner to produce a selected color.

13. The apparatus according to claim 9 wherein the warning light further comprises at least one reflective surface.

14. A motor vehicle comprising:
    a rear body defining a compartment;
    a compartment lid movable relative to the rear body between an open position and a closed position;
    a light source located on an underside of the compartment lid; and
    a reflective panel disposed on a lid-receiving portion of the body inside of the compartment in an upward-facing position and angled relative to the light source to reflect light emitted by the light source when the lid is in the open position toward the compartment lid.

15. The motor vehicle according to claim 14 wherein the light source comprises a plurality of illumination sources, which are individually controllable.

16. The motor vehicle according to claim 15, wherein the plurality of illumination sources comprises light emitting diodes of at least two different colors, the light emitting diodes being individually controllable in intensity of light emitted in a manner to produce a selected color.

17. The motor vehicle according claim 14 wherein the light source is detachably attached to the compartment lid and comprises an energy source powering the light source when detached from the compartment lid.

18. The motor vehicle according to claim 17, wherein the light source comprises three lighted segments foldable relative to one another when detached from the compartment lid to form a triangle.

19. The motor vehicle according to claim 18, wherein a first end of the light source is attachable to an opposite second end of the light source to form the triangle.

20. The motor vehicle according to claim 14 wherein the light source further comprises at least one reflective surface.

\* \* \* \* \*

UNITED STATES PATENT AND TRADEMARK OFFICE
CERTIFICATE OF CORRECTION

| | | |
|---|---|---|
| PATENT NO. | : 8,833,988 B2 | Page 1 of 1 |
| APPLICATION NO. | : 13/438380 | |
| DATED | : September 16, 2014 | |
| INVENTOR(S) | : Annika Larsson et al. | |

It is certified that error appears in the above-identified patent and that said Letters Patent is hereby corrected as shown below:

In the Claims

Column 6, Line 16, Claim 5:

After "the illumination system according"
Insert -- to --.

Column 7, Line 9, Claim 17:

After "The motor vehicle according"
Insert -- to --.

Signed and Sealed this
Sixth Day of January, 2015

Michelle K. Lee
*Deputy Director of the United States Patent and Trademark Office*